United States Patent [19]
Valentine

[11] 3,800,668
[45] Apr. 2, 1974

[54] BREATHING AND FAILURE DETECTION SYSTEM FOR SPRING BRAKES

[75] Inventor: Harry M. Valentine, Elyria, Ohio

[73] Assignee: The Bendix Corporation, South Bend, Ind.

[22] Filed: Apr. 3, 1972

[21] Appl. No.: 240,625

[52] U.S. Cl. ............................ 91/399, 92/63, 92/64
[51] Int. Cl. ...... F01b 25/26, F01b 7/00, F01b 21/02
[58] Field of Search ................. 92/63, 64; 91/1, 399

[56] References Cited
UNITED STATES PATENTS

| | | | |
|---|---|---|---|
| 3,406,609 | 10/1968 | Cox | 92/63 |
| 3,090,359 | 5/1963 | Hoppenstand | 303/6 M |
| 3,502,003 | 3/1970 | Dubrickin et al. | 92/63 |

Primary Examiner—Edgar W. Geoghegan
Assistant Examiner—A. M. Zupcic
Attorney, Agent, or Firm—Ken C. Decker; William N. Antonis

[57] ABSTRACT

A service and spring brake actuator for vehicle brakes including service and spring brake chambers arranged in tandem, the spring brake chamber including a spring cavity and a fluid pressure control cavity and wherein a pair of valves are provided for interconnecting the spring cavity with the service chamber and for interconnecting the control chamber with the spring cavity during operation of the spring brake actuator during spring brake application and release of the brakes in order to prevent the entry of dirt and other foreign matter into the spring cavity. Means are also provided for automatically indicating a failure or loss of load of the main spring and failure or serious leakage of the seal between the control and spring cavities.

3 Claims, 4 Drawing Figures

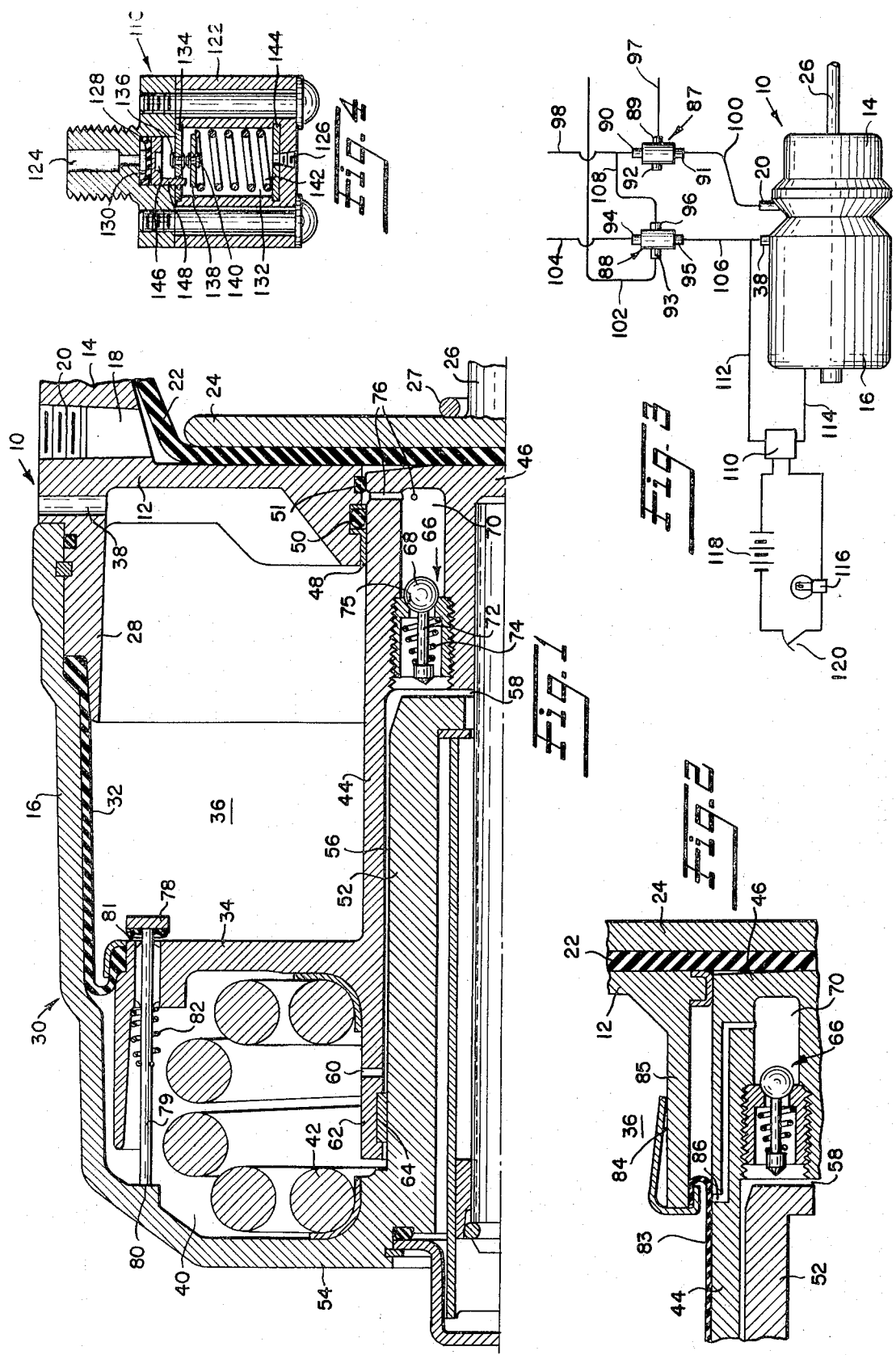

BREATHING AND FAILURE DETECTION SYSTEM FOR SPRING BRAKES

Tandem service and spring brake actuators have heretofore been provided and one of the serious problems in the operation of such devices has been the accumulation of dirt and moisture within the spring cavity of the spring brake actuator. This is due to the use of open vents for the spring cavity in order to allow flow of outside air to and from the cavity during spring brake application and release. It will be readily understood that such dirt and moisture results in corrosion and deterioration of the parts of the spring actuator so that frequent servicing thereof has been necessary. While attempts have been made to solve this problem, they have not been entirely satisfactory due to complications in design.

The present invention is directed to a novel breathing and failure indicating system for spring brake actuators of the type wherein the spring cavity is not vented to the atmosphere and one of the objects of the invention is to allow the flow of air from within the actuator assembly to and from the spring cavity so that dirt and moisture present in the outside air is not delivered to the spring control or connecting cavities.

Another object of the invention is to provide a breathing system of the above character which incorporates a novel valve construction for allowing air flow from the spring cavity to the service brake chamber during spring brake application.

Another object of the invention is to provide a breathing system of the above character wherein the novel valve construction allows air flow from the spring brake control cavity to the spring cavity during the last portion of the stroke of the spring brake actuator during release thereof.

Another object of the invention is to provide a means of automatically detecting and visibly and/or audibly indicating a failure of or loss of load in the main spring, or a failure of or leak in the common air seal between the control and spring cavities.

A further object is to provide a novel breathing control valve construction including a pair of separate valves carried by the spring brake piston for controlling fluid flow to and from the spring cavity of the spring brake actuator.

A further object is to provide a breathing control valve construction which will be operative to prevent air flow from the service actuator to the spring cavity when the spring brake actuator is in its applied position.

Other objects and novel features of the invention will appear more fully hereinafter from the following detailed description when taken in connection with the accompanying drawings illustrative of one form of the invention. It will be expressly understood however, that the drawings are not to be taken as a definition of the limits of the invention, reference being had for this purpose to the appended claims.

Referring to the drawings wherein similar reference characters denote similar parts throughout the several views:

FIG. 1 is an axial partial view in cross-section of a combined service brake and spring brake actuator incorporating the novel breather valve features of the invention;

FIG. 2 is an enlarged partial view in section of a modified form of breather valve and associated parts when the spring actuator is moved to a brake released position;

FIG. 3 is a diagrammatic view of the actuator of FIG. 1 in combination with a novel valve arrangement for controlling the actuator together with the novel failure detection means, and FIG. 4 is a sectional view of a pressure differential switch which may be employed in connection with the failure detection system of the invention.

Referring now to the drawings, the numeral 10 designates broadly the housing of a combined service brake and spring brake actuator. The housing is divided by a central wall 12 into a service actuator part 14 and a spring actuator part 16. The service part 14 includes a service pressure chamber or cavity 18 which is adapted to be connected to the usual brake valve by way of a port 20. When service pressure is delivered to the pressure chamber 18 it operates on a diaphragm 22 to exert a brake applying force on a push plate 24 and push rod 26 against the force of a return spring 27 to apply the brake in a manner well recognized in the art.

Integral with the wall 12 is a stepped lip 28 which is telescopically received within the annular opening defined by the open end of a hollow spring brake cylinder 30 which is divided by a diaphragm 32 and a piston portion 34 into a pressure chamber or control cavity 36 adapted to be connected to a source of emergency fluid pressure by way of a port 38 and a spring chamber 40 containing a brake applying spring 42.

Integral with the piston 34 is a forwardly extending sleeve or shaft 44 the forward end 46 defining a brake applying abutment with the sleeve 44 being slidably and sealably received in a central opening 48 in the wall 12 separating the service and pressure cavities 18 and 36 and annularly grooved to receive O-rings 50 and 51 which serve to seal the cavities 18, 36 from each other. As shown, a fixed sleeve 52 extends forwardly from the rear wall 54 of the cylinder 30 and is positioned within the sleeve 44 with clearance defining an annular passage 56 connecting a cavity 58 at the forward end of the sleeve 44 with the spring chamber 40 by way of a series of ports, one of which is shown at 60, said port being provided in a rearward extension 62 of sleeve 44. A suitable bearing 64 is carried by the extension 62 and engages the fixed sleeve 52.

The novel breathing valve construction of the present invention is illustrated in FIG. 1 as including a check valve 66 carried by the sleeve 44 so as to be movable with the spring piston 34. More particularly, the check valve 66 includes a valve head 68 positioned within a valve cavity 70, the head 68 being secured to a stem 72 which is provided with a spring 74 which constantly tends to urge the head 68 into seating engagement with a valve seat 75 in order to interrupt communication between the cavities 70 and 58. The outer end portion of the sleeve 44 is provided with one or more radial holes 76 which connect the valve cavity 70 with the service cavity 18 depending upon the axial position of the sleeve 44. As shown in FIGS. 1 and 2 the spring piston 34 occupies its released position by reason of the admission of fluid pressure to the control cavity 36 through port 38. In such position, the holes 76 lie between the O-ring seals 50 and 51 so that the cavity 70 and hence the spring cavity 40 are sealed from communication with either the control chamber 36 or the service chamber. However, it will be understood that when fluid pressure is released from the control cavity 36, as hereinafter described, and the spring 42 is effective to move the piston 34 and parts connected thereto to the right, as viewed in FIG. 1, the valve cavity 70 will be connected with the service chamber 18 as soon as the holes are moved beyond the seal 51. When this occurs, the spring cavity 40 will likewise be in communication with the service chamber 18.

In addition to the check valve 66, the novel breathing valve construction of the invention also includes a second check valve 78 carried by the piston 34 and provided with a stem 79 which is arranged to contact a stop 80 formed on the end wall 54 as illustrated. Thus, in the position shown, the valve 78 will be moved off its seat 81 against the action of return spring 82 in order to establish communication between the control cavity 36 and the spring cavity 40. This action occurs as the piston 34 approaches its release position, it being understood that with the check valve 78 in open position, the excess of fluid pressure within the control cavity 36 above that required to compress the spring 42 to the desired release position flows to the spring cavity 40. Piston 34 never moves any further to the left, as viewed in FIG. 1 than as shown and therefore does not contact any fixed stop. Thus, the spring cavity 40 is charged with the excess of fluid pressure above that required in the control chamber 36 to move the spring piston 34 to the desired release position. It will be understood that when such excess pressure is built up in the spring cavity 40, the piston 34 will move slightly to the right to lap the valve 78 when such excess pressure plus the load of the spring 42 is slightly greater than the pressure applied to the control cavity 36.

During spring brake operation of the spring actuator 16, as shown in FIG. 1, it will be understood that when fluid pressure is released from the control cavity 36, the piston 34 and sleeve 44 will be moved to the right. During such movement, the holes 76 move to the right of seal 51 in order to communicate with the service chamber 18. While valve spring 74 attempts to maintain the check valve 66 closed, the surplus pressure in the spring cavity 40 opens valve 66 and such pressure is exhausted through the holes 76 into the service cavity 18 and finally to atmosphere via the exhaust port of the brake valve. When the pressure within the spring cavity 40 is finally dissipated, the spring 74 moves the valve head 68 onto the seat 75 to close the check valve 66.

In the position shown in FIG. 1, it will be understood that a service application of the service actuator 10 may be effected by merely operating the usual brake valve to charge the service chamber 18.

When it is desired to release a spring brake application, fluid pressure may be admitted to the control chamber 36 via the usual spring brake control valve and the parts will be restored to the position illustrated in FIG. 1. During this action residual fluid pressure within the spring chamber 40 will flow to the service chamber 18 via holes 60, passage 56, cavity 58, check valve 66, cavity 70 and holes 76. As the holes 76 approach the seal 50 and are finally sealed by the latter, the valve stem 79 abuts the stop 80. Further but slight movement of the piston 34 to the left, as viewed in FIG. 1 causes the check valve 78 to open so that the excess of fluid pressure above that required to move the spring piston 34 to the desired release position flows to the spring cavity 40 as heretofore described. Any loss of such pressure from the spring cavity 40 by way of the passage 56, valve 66, cavity 70 and holes 76 will be prevented by the seal 51.

The modification shown in FIG. 2 is similar to FIG. 1 but illustrates an alternative type of seal between the control cavity 36, the service chamber 18 and the valve cavity 70 wherein the seal 51 of FIG. 1 is omitted and a rolling diaphragm 83 replaces the sliding seal 50. As shown, the diaphragm 83 is suitably attached at one end by a retainer 84 to a hub extension 85 of the wall 12 and is also secured at its opposite end to the sleeve 44 (not shown). Valve cavity 70 communicates with holes 86 which are sealed by the diaphragm 83 as shown in FIG. 2 which illustrates the position of the parts when the spring brake 30 is released. However, during a spring brake application, the sleeve 44 will move to right so that the holes 86 will be uncovered by the diaphragm 83 to interconnect the spring cavity 40 with the service chamber 18.

Referring now to FIG. 3, the combined service and spring brake actuator 10 described above is shown therein in combination with a novel valve arrangement for controlling the application of fluid pressure to and from the service chamber 18 and the control chamber 36 of the spring actuator 16. More particularly, the valve arrangement includes a pair of valves 87 and 88 which may be of the quick release type shown in U.S. Pat. No. 2,718,897 granted to Earl T. Andrews on Sept. 27, 1955. Valve 87 is provided with an inlet port 89, a pair of outlet ports 90, 91 and an exhaust port 92, while the valve 88 is similarly provided with an inlet port 93, a pair of outlet ports 94, 95 and an exhaust port 96. The inlet port 89 is connected to a conventional brake valve (not shown) by a conduit 97 while the outlet ports 90 and 91 are respectively connected by conduits 98 and 100 with the service portions 14 of one or more tandem spring brake actuators constructed as heretofore described, one such actuator being shown at 10 in FIG. 3. Valve 88 has its inlet port 93 connected with a conventional spring brake parking control valve (not shown) by a conduit 102 while the outlet ports 94 and 95 of valve 88 are respectively connected by conduits 104 and 106 with the ports 38 of the spring brake portions 16 of the tandem actuators 10. The exhaust port 96 of the valve 88 is connected to the conduits 98 and 100 by a conduit 108 so that whenever the brake valve is operated to charge the conduits 98 and 100 to effect a service application of the tandem actuators 10, fluid pressure will be simultaneously conducted to the ports 38 of the spring brake actuator portions 16, assuming of course that the conduit 102 has been exhausted to allow a spring brake application of the portion 16 of the actuator 10. In this manner, as the service brake portion 14 is applied, the spring brake application is released by and in proportion to the fluid pressure admitted to the ports 38 thus preventing a compounding of spring brake and service brake pressures.

In operation of the system shown in FIG. 3, it will be understood that the spring brake portion 16 is normally maintained in a released position by operation of the spring brake parking control valve which charges the conduit 102 and through operation of the valve 88, also charges the conduits 104 and 106. Fluid pressure thus admitted to the control cavity 36 of the actuators 10 will therefore maintain the springs 42 in a compressed and inactive condition. Normal service application of the service portion 14 may be effected by operating the brake valve to charge the conduits 98 and 100 through the valve 87. Since the exhaust port 96 of the valve 88 will be closed by the pressure at port 93, the charging of conduit 108 will have no effect. In the event however, that the spring brake control valve is moved to the park position to exhaust conduit 102, the control chamber 36 will be exhausted to atmosphere by way of the conduit 106, exhaust port 96 of valve 88, conduit 108, conduit 98 and the exhaust port 92 of the valve 87. Thus the spring 42 will be effective to apply the brakes by spring pressure and during this operation, the spring chamber 40 will be connected with the service chamber 18 by operation of the valve 66 as heretofore described.

It will also be understood that the valve arrangement of the system of FIG. 3 is such that the compounding of service and spring brake forces is prevented. For example, with the spring brake applied, as just described, a service brake application may be effected by operating the brake valve to charge the conduit 97 and conduit 100 leading to the service actuator portion 14 through the valve 87 which functions to close the exhaust 92 and connect the outlet ports 90 and 91 to the inlet port 89. Fluid pressure will also be conducted to the control chamber 36 of the spring brake portion 16 by way of the exhaust port 96 of the valve 88 and the outlet ports 94 and 95, it being understood that when fluid pressure is admitted to the exhaust port 96, the inlet port 93 of the valve 88, which was previously connected with the atmosphere, is closed. Thus, fluid pressure within the control chamber 36 will release the spring brake action as the service portion is applied and compounding of the braking forces due to spring action and service brake application will be avoided.

As shown in FIG. 3, a conventional differential pressure switch 110 may be connected to the conduit 106 and the spring cavity 40 by respective conduits 112 and 114 to energize a signal 116 in a circuit including battery 118 and ignition switch 120 in order to indicate an application of the spring brake or a failure of the spring 42 or diaphragm 32.

More particularly, and referring to FIGS. 3 and 4, the differential pressure switch 110 includes a housing 122 having a first port 124 connected with conduit 112 and a second port 126 connected with conduit 114, and also having a pressure responsive O-ring diaphragm 128 therein separating the interior of the housing into a cavity or chamber 130 and a chamber 132. A contact plate 134 carrying a contact 136 is fixed in the housing and a contact disc 138 carrying a contact 140 is normally urged by a spring 142 toward a position where contacts 136 and 140 are engaged. The opposite end of the spring 142 engages a contact member 144 and the plate 134 and member 144 are connected to the battery 118 and signal 116 to complete the circuit to the latter when the contacts 136 and 140 are engaged and the ignition switch 120 is closed. Desirably, the plate 134 and the member 144 are insulated from each other so that the electrical circuit is completed through the spring 142 when the contacts are closed. As shown, a piston 146 engages the diaphragm 128 and is provided with a finger 148 for engaging the contact disc 138 and separating the contacts 136 and 140 when the pressure in the conduit 112 and hence the control cavity 36 exceeds the pressure in the spring cavity 40 by a predetermined amount. The area of the diaphragm 128 subject to the opposing pressures in the cavity 130 and the chamber 132 and the spring force of the spring 142 are such that the contacts 136, 140 will be opened when the pressure in control cavity 36 is greater than the pressure within the spring cavity 40 by an amount sufficient to move the spring piston 34 to the desired release position.

In normal operation, a spring brake application is effected by exhausting conduits 102 and 106 as heretofore described. Thus conduit 112 is exhausted to atmosphere as is the conduit 114 and in the absence of any fluid pressure within the cavity 130 and chamber 132 of the pressure switch 110, the contacts 136 and 140 are closed by the spring 142 thus energizing the signal 116 and providing an indication of spring brake operation of the vehicle brake.

To release a spring brake application, fluid pressure is applied to the control cavity 36 as above described and this same pressure is applied to the cavity 130 to overcome the effect of the spring 142 causing the contacts 136, 140 to open. Fluid pressure admitted to the control cavity 36 in excess of that required to move the piston 34 to the release position will spill over into the spring cavity 40, as heretofore described, to maintain the fluid pressure differential across the piston. This spill-over is also conducted to the chamber 132 of the pressure switch 110 to maintain a similar differential across the diaphragm 128 and therefore, the contacts 136, 140 remain open and the signal 116 remains de-energized. In this manner, the signal 116 which may be a light or an audible alarm will indicate a spring brake application or a release of the vehicle brakes.

In the event however, that the spring 42 of the spring brake is broken and with the control cavity 36 charged with fluid pressure, it will be understood that the pressures within the control cavity 36 and the spring cavity 40 will equalize. This is due to the fact that the spring will not be able to lap the valve 78 which will remain open. Hence, no pressure differential will be developed in the chambers 130 and 132 of the pressure switch 110 and the spring 142 will close the contacts 136, 138 to energize the signal 116. The latter will also be energized in the event that the diaphragm 32 developes a leak such that the pressures within the cavities 36 and 40 equalize regardless of the lapping of the valve 78 by the spring 42. Thus it is seen that the failure detection system illustrated in FIGS. 3 and 4 provides a visual or audible indication of the failure of the spring brake whether it be caused by a broken spring or a leaky diaphragm which normally seals the chambers 36 and 40 from each other.

From the foregoing, it will be readily seen that the invention provides a novel breathing system and a failure indicating system for the spring brake portion of a tandem spring brake and service actuator wherein fluid entering the spring cavity is derived from the fluid brake system, thus avoiding the possibility of the entrance of dirt and moisture. The provision of the novel breather valve construction serves to connect the spring cavity with the control cavity to insure flow of clean air to the spring cavity as the spring is compressed to release a spring brake application. The construction is also such that the clean air in the spring cavity is exhausted into the service brake chamber during a spring brake application. In addition, the novel check valve 66 allows residual pressure in the spring cavity to flow into the service brake chamber during compression of the spring during brake release up to the time when the spring cavity is connected with the control cavity by check valve 78. The invention also provides a detection system for indicating to the operator a broken spring or leaky diaphragm in the spring actuator, it being understood that a failure of the spring brake would occur upon the happening of the former of these events and that an automatic application of the spring brake would occur upon the happening of the latter of these events.

While one embodiment of the invention has been shown and described herein, it will be understood that the scope thereof is to be determined by the appended claims.

What is claimed is:

1. In a tandem spring and service brake actuator for applying a vehicle brake, comprising a service actuator provided with a fluid pressure receiving chamber having a brake applying element therein, a spring actuator having a piston dividing the latter into a fluid pressure control cavity and a spring cavity, a piston rod connected with said piston and arranged to actuate the brake applying element of said service actuator and a spring within the spring cavity for operating said piston in one direction to apply the brake when fluid pressure is released from said control cavity, application of fluid pressure to said control cavity moving said piston in the opposite direction and compressing said spring to release the brake, the invention which comprises first valve means for connecting the spring cavity and chamber during spring operation of said piston to apply the brake when fluid pressure is released from said control cavity and second valve means carried by said piston for connecting said control cavity and spring cavity when fluid pressure is applied to said control cavity to move said piston to compress said spring and release the brake, said second valve means including a spring-closed check valve carried by said piston, and a stationary part for opening said check valve to connect the spring cavity and control cavity when said piston is moved in said opposite direction to a predetermined position.

2. The actuator of claim 1 wherein said first valve means includes a spring-closed check valve carried by said piston rod, an interior wall within the actuator separating the chamber and control cavity, said piston rod including a hollow sleeve positioned in an opening in said wall and having an end portion for actuating said brake applying element and wherein said first valve means includes a seal carried by said wall and engaging said sleeve, a valve cavity in which said first valve means is mounted, said sleeve being provided with an opening arranged to be uncovered by said seal to connect said valve cavity and said chamber when said piston is moved in said one direction, and a second seal carried by said wall and engaging said sleeve, said opening being positioned between said seals when said piston is moved in said opposite direction to compress the spring.

3. The actuator of claim 2 wherein said seal comprises a rolling diaphragm having its opposite ends respectively secured to said wall and said sleeve.

* * * * *